US005931253A

United States Patent [19]

Shimizu et al.

[11] Patent Number: 5,931,253

[45] Date of Patent: Aug. 3, 1999

[54] AUTOMATIC STEERING SYSTEM FOR VEHICLE

[75] Inventors: Yasuo Shimizu; Katsuhiro Sakai, both of Wako, Japan

[73] Assignee: Honda Giken Kogyo Kabushiki Kaisha, Tokyo, Japan

[21] Appl. No.: 09/059,281

[22] Filed: Apr. 14, 1998

[30] Foreign Application Priority Data

Apr. 15, 1997 [JP] Japan .................................... 9-097601

[51] Int. Cl.[6] ........................................................ B62D 1/00

[52] U.S. Cl. ............................. 180/204; 180/446; 701/41

[58] Field of Search .................................... 180/204, 446, 180/167, 168, 169; 701/23, 25, 41

[56] References Cited

U.S. PATENT DOCUMENTS

| | | | |
|---|---|---|---|
| 4,735,274 | 4/1988 | Good et al. | 180/204 |
| 4,931,930 | 6/1990 | Shyu et al. | 180/204 |
| 5,742,141 | 4/1998 | Czekaj | 180/204 |
| 5,764,015 | 6/1998 | Shimizu et al. | 318/587 |

FOREIGN PATENT DOCUMENTS

| | | | |
|---|---|---|---|
| 61-263851 | 5/1985 | Japan | 701/41 |
| 3-74256 | 3/1991 | Japan . | |
| 4-55168 | 2/1992 | Japan . | |

*Primary Examiner*—Kevin Hurley
*Assistant Examiner*—William Zimmerli
*Attorney, Agent, or Firm*—Nikaido, Marmelstein, Murray & Oram, LLP

[57] ABSTRACT

The elimination of a steering angle detector from an automatic steering system including an electric motor used as an actuator is accomplished and the steering angle of a wheel is calculated based on the rotational angle of the electric motor. In the electric motor, if a terminal voltage is represented by u; a supplied current is j; a resistance is R; an inductance is L; a rotational angle is α; and a constant depending on characteristic of the electric motor is K, the terminal voltage u is represented by the following equations:

$$u = L\frac{di}{dt} + Ri + K\left(\frac{d\alpha}{dt}\right)$$

If this equation is solved with respect to the rotational angle α and the inductance L having a small value is omitted, the rotational angle α is given according to the following equation:

$$\alpha = \frac{1}{K}\int (u - Ri)dt$$

The rotational angle α of the electric motor and the steering angle of the wheel are in a proportional relationship to each other and hence, if the rotational angle α is calculated from the terminal voltage u and the supplied current j to the electric motor, the steering angle of the wheel can be found. Thus, a steering angle detector can be eliminated.

4 Claims, 3 Drawing Sheets

LONGITUDINAL PARKING RIGHT
LONGITUDINAL PARKING LEFT
REVERSE PARKING RIGHT
REVERSE PARKING LEFT
θ ref
0
TRAVELING DISTANCE X
22
23
21
Wr
Wf
S6
S8
S7
S5
S4
S3
S2
Si
Su
1
2
3
4
5
6
7
8
9
10
11
V u:TERMINAL VOLTAGE
i:SUPPLIED CURRENT
R:RESISTANCE
L:INDUCTANCE
e:COUNTER ELECTROMOTIVE FORCE
α:ROTATIONAL ANGLE

AUTOMATIC STEERING SYSTEM FOR VEHICLE

BACKGROUND OF THE INVENTION

1. Field of the Invention

The present invention relates to an automatic steering system for a vehicle for automatically parking the vehicle without recourse to steering by the driver.

2. Description of the Prior Art

Such automatic steering systems for vehicles are already known from Japanese Patent Application Laid-Open Nos. 3-74256 and 4-55168. These automatic steering systems for vehicles utilize an actuator for the conventionally well-known electric power steering system, and are designed so that the reverse parking or the longitudinal parking is automatically performed by controlling the actuator based on the relationship between the traveling distance of the vehicle and the steering angle which are stored in advance.

In such a steering control system for a vehicle, in steering by the actuator, feedback control is carried out to equalize the actual steering amount of the wheel detected by a steering angle detecting means such as a potentiometer, to a target steering angle, which is determined based on the locus of movement of the vehicle.

SUMMARY OF THE INVENTION

It is an object of the present invention to ensure that even if the rotational angle detecting means is eliminated, the steering angle can be detected based on the rotational angle of the electric motor functioning as an actuator.

To achieve the above object, according to the present invention, there is provided an automatic steering system for a vehicle having wheels, comprising a movement locus setting means for storing or calculating a locus of movement of a vehicle to a target position, an electric motor adapted to steer steerable wheels of the vehicle wheels, and a control means for controlling the rotational angle of the electric motor to generate a steering angle for the wheel so as to permit the vehicle to pass through the locus of movement. The control means calculates the rotational angle based on a terminal voltage and a supplied current of the electric motor.

With the above arrangement, the rotational angle of the electric motor can be calculated utilizing a known voltage detecting means and a known current detecting means provided for the purpose of controlling the electric motor. Therefore, by the fact that the steering angle of the wheel is determined from the rotation angle, the steering angle detecting means conventionally required in an automatic steering system can be eliminated to reduce the number of parts and the cost.

According to the present invention, the locus of movement is set in terms of the steering angle of the wheel, relative to the traveling distance of the vehicle.

With the above arrangement, a consistent locus of movement can be ensured, irrespective of variations in vehicle speed during automatic parking control.

BRIEF DESCRIPTION OF THE DRAWINGS

The mode for carrying out the present invention will now be described by way of an embodiment shown in the accompanying drawings.

DETAILED DESCRIPTION OF THE PREFERRED EMBODIMENT

Figure 1:
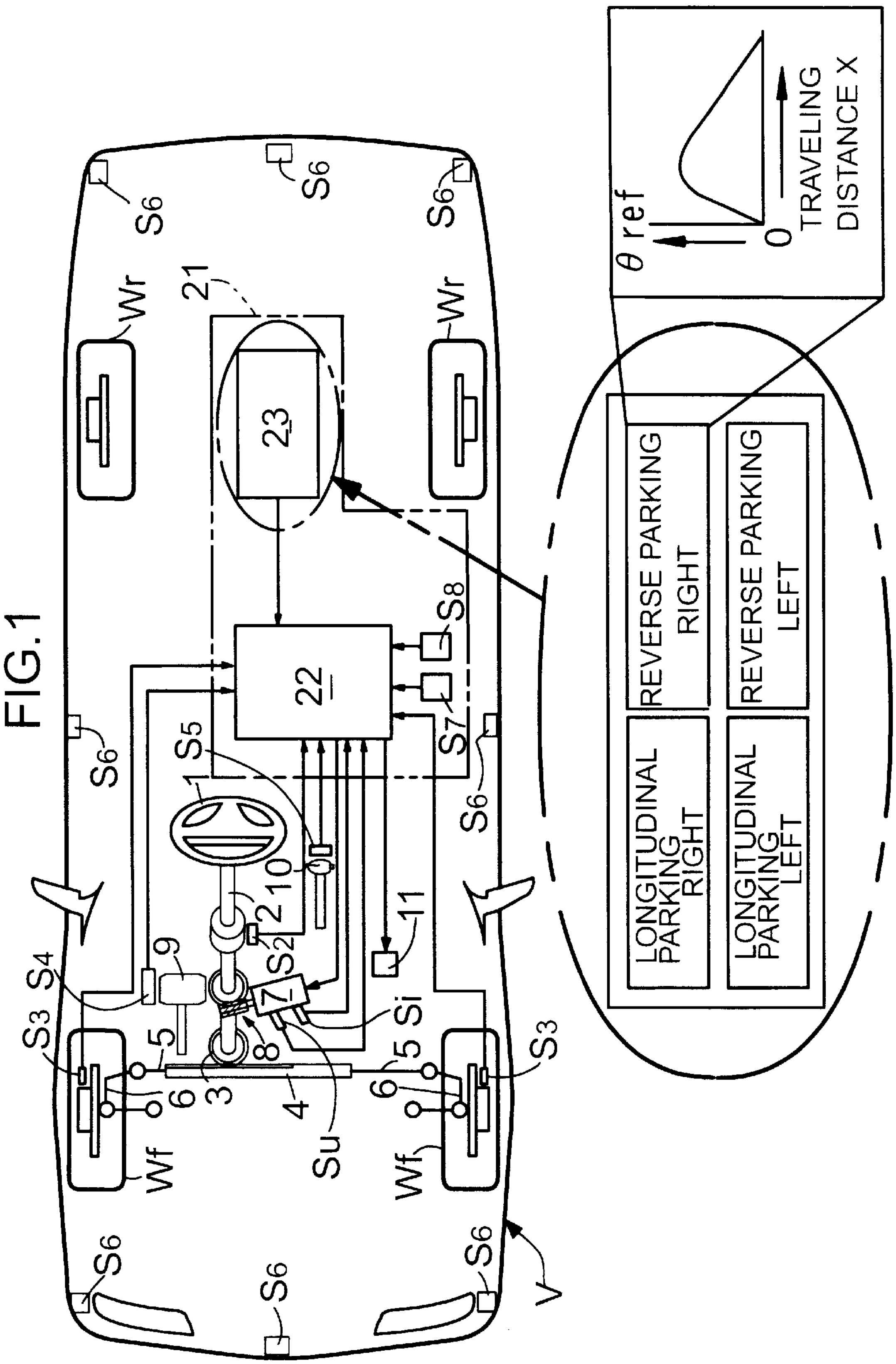
FIG. 1 is an illustration of a vehicle equipped with a steering control system according to the embodiment of the present invention.

As shown in FIG. 1, a vehicle V includes a pair of front wheels Wf, Wf and a pair of rear wheels Wr, Wr. A steering wheel 1 and the front wheels Wf, Wf which are the steering wheels, are interconnected by a steering shaft 2 rotated in unison with the steering wheel 1, a pinion 3 provided at a lower end of the steering shaft 2, a rack 4 meshed with the pinion 3, left and right tie rods 5 provided at opposite ends of the rack 4, and left and right knuckles 6 connected to the tie rods 5. A steering actuator 7 having an electric motor, is connected to the steering shaft 2 through a worm gear mechanism 8, in order to assist in the operation of the steering wheel 1 by a driver, or to conduct automatic steering for garaging of the vehicle.

A steering control system 21 comprises a controller 22 and a storage means 23. Input to the controller 22 are signals from a voltage detecting means Su and a current detecting means Si for detecting a terminal voltage u and a supplied current i in the electric motor 7, to detect a rotational angle $\alpha$ of the electric motor 7. A steering torque detecting means $S_2$ detects the steering torque of the steering wheel 1; front wheel rotational angle detecting means $S_3$, $S_3$ detect rotational angles of the left and right front wheels Wf, Wf; a brake operational amount detecting means $S_4$ detects the operational amount of a brake pedal 9; a shift range detecting means $S_5$ detects the shift range selected by a select lever 10 (the "D" range, "R" range, "N" range, "P" range or the like); and eight object detecting means $S_6$ are mounted at the front portion, central portion and rear portion of the vehicle V. The object detecting means $S_6$ may be of any known type, such as sonar, radar, television camera or the like. Lines connecting the eight object detecting means $S_6$ and the controller 22 are omitted from the drawings for the purpose of preventing the complication of the drawings. The storage means 23 functions as a movement locus setting means of the present invention.

Further, a mode selecting switch $S_7$ and an automatic parking start switch $S_8$ operated by the driver are connected to the controller 22. The mode selecting switch $S_7$ is operated to select any of four parking modes: a reverse-parking/right mode, a reverse-parking/left mode, a longitudinal parking/right mode, and a longitudinal parking/left mode, which will be described hereinafter. The automatic parking start switch $S_8$ is operated to start automatic parking in any mode selected by the mode selecting switch $S_7$.

Data for the four parking modes, i.e., relationships of reference steering angles θref to traveling distances X of the vehicle V are previously stored as a table in the storage means 23. The traveling distance X of the vehicle V is calculated by multiplying the known peripheral length of the front wheel Wf by the rotational angle of the front wheel Wf detected by the front wheel rotational-angle detecting means $S_3$. Either one of a high-select value and a low-select value output from the pair of left and right front wheel rotational-angle detecting means $S_3$, $S_3$, and an average value of the high-select value and the low-select value is used for the calculation of the traveling distance X.

The controller 22 controls the operation of the electric motor 7 and the operation of an operational stage display device 11 including a liquid crystal monitor, a speaker, a lamp, a chime, a buzzer or the like, based on the signals from the detecting means Su, Si, $S_2$–$S_6$ and the switches $S_7$ and $S_8$, and the data for the parking modes stored in the storage means 23.

The operation of the embodiment of the present invention having the above-described arrangement will be described below.

When the vehicle is in a usual state in which the automatic parking is not carried out (when the automatic parking start switch $S_8$ is not in an ON state), the steering control unit 21 functions as a regular power-steering control unit. More specifically, when the steering wheel 1 is operated by the driver to turn the vehicle V, the controller 22 controls the electric motor 7, based on the rotational angle $\alpha$ of the electric motor 7 calculated from the terminal voltage u and the supplied current i in the electric motor 7 and the steering torque detected by the steering torque detecting means $S_2$. As a result, the left and right front wheels Wf, Wf are steered by the driving force from the electric motor 7, whereby the steering operation provided by the driver is assisted.

The contents of an automatic parking control will be described with the reverse parking/left mode (the mode in which the parking is conducted while the vehicle is being moved backwards to a parking position lying on the left side of the vehicle V)taken as an example.

Figure 2A:
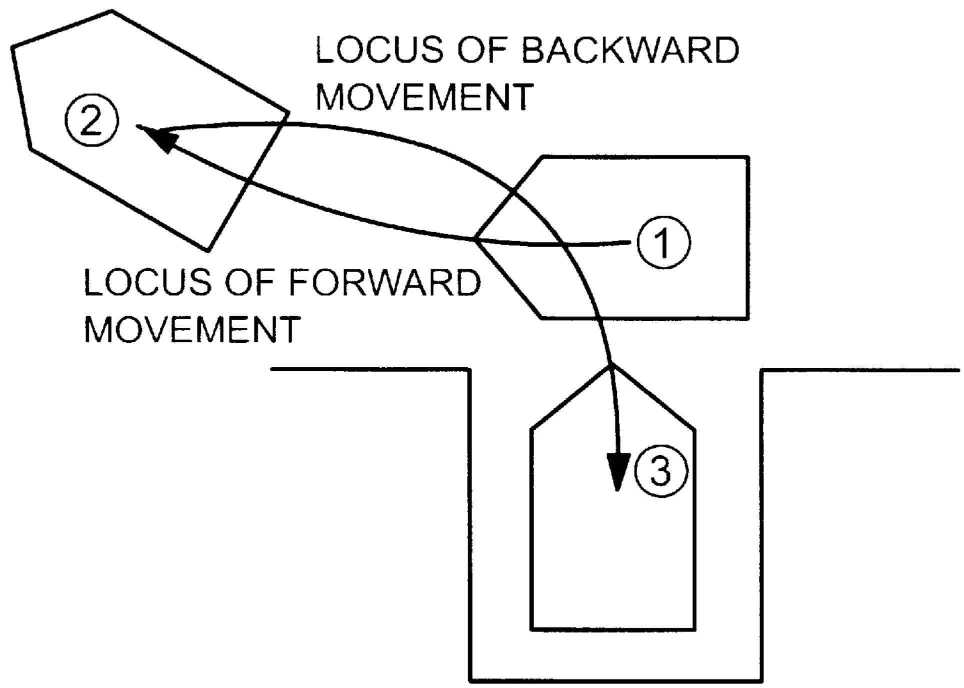
FIGS. 2A and 2B are illustrations for explaining the operation of the present invention in a reverse parking/left mode.

First, as shown in FIG. 2A, vehicle V is moved near to a garage where the vehicle V is to be parked, with the left side of the vehicle body located as close as possible to an inlet line of the garage. The vehicle V is stopped at a position (a start position (1)) at which a predetermined reference point (e.g., a left sideview mirror) is matched with a center line of the garage. When the mode selecting switch $S_7$ is operated to select the reverse parking/left mode and the automatic parking start switch $S_8$ is turned ON, the automatic parking control is started. While automatic parking control is being conducted, the current position of the subject vehicle, surrounding obstacles, the parking position, a presumed locus of movement of the subject vehicle from the start position to the parking position, the reversing position for switch-over from the forward movement to the backward movement and the like, are indicated on the operational stage display device 11, and in addition, various instructions and warnings as to operation of the select lever 10 at the reversing position and the like are emitted by voice from the speaker to the driver.

Upon loosening of the brake pedal 9 by the driver, to perform creeping of the vehicle V, the front wheels Wf, Wf are automatically steered based on the data for the reverse parking/left mode selected by the mode selecting switch $S_7$, even if the steering wheel 1 is not operated. More specifically, while the vehicle is being moved forwards from the start position (1) to the reversing position (2), the front wheels Wf, Wf are automatically steered to the right. While the vehicle is being moved backwards from the reversing position (2) to the target position (3), the front wheels Wf, Wf are automatically steered to the left.

Figure 2B:
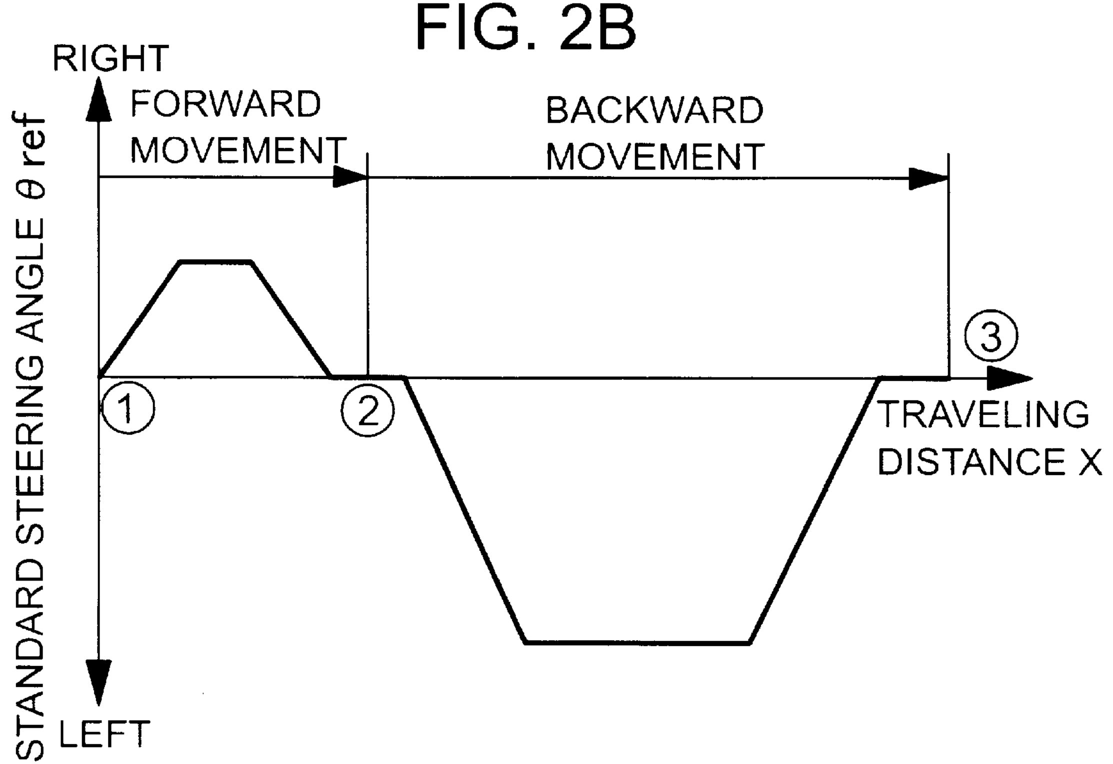

As can be seen from FIG. 2B, while automatic steering is being carried out, the controller 22 calculates a deviation E=θref−θ based on a standard steering angle Oref in the reverse parking/left mode read out from the storage means 23 and the steering angle θ of the front wheels Wf, Wf calculated from the rotational angle $\alpha$ of the electric motor 7, and controls the operation of the electric motor 7, so that the deviation E is equal to 0. At this time, data of the reference steering angle θref is set in correspondence to the traveling distance X of the vehicle V and hence, even if there is a variation in vehicle speed in creeping, the vehicle is always moved on the locus of movement.

The automatic parking control is canceled when the driver has turned OFF the mode selecting switch $S_7$. In addition to this case, when the driver's foot is released from the brake pedal 9, and the driver operates the steering wheel 1, or when any of the object detecting means $S_6$ detects an obstacle, the automatic parking control is canceled, returning to the usual power-steering control. During the automatic parking control, like in the power-steering control, the operation of the electric motor 7 is controlled based on the terminal voltage u and the supplied current j the electric motor 7 and the steering torque of the steering wheel 1.

A technique for calculating the rotational angle $\alpha$ of the electric motor 7 from the terminal voltage u and the supplied current j to the electric motor 7 will be described below with reference to FIG. 3.

Figure 3:
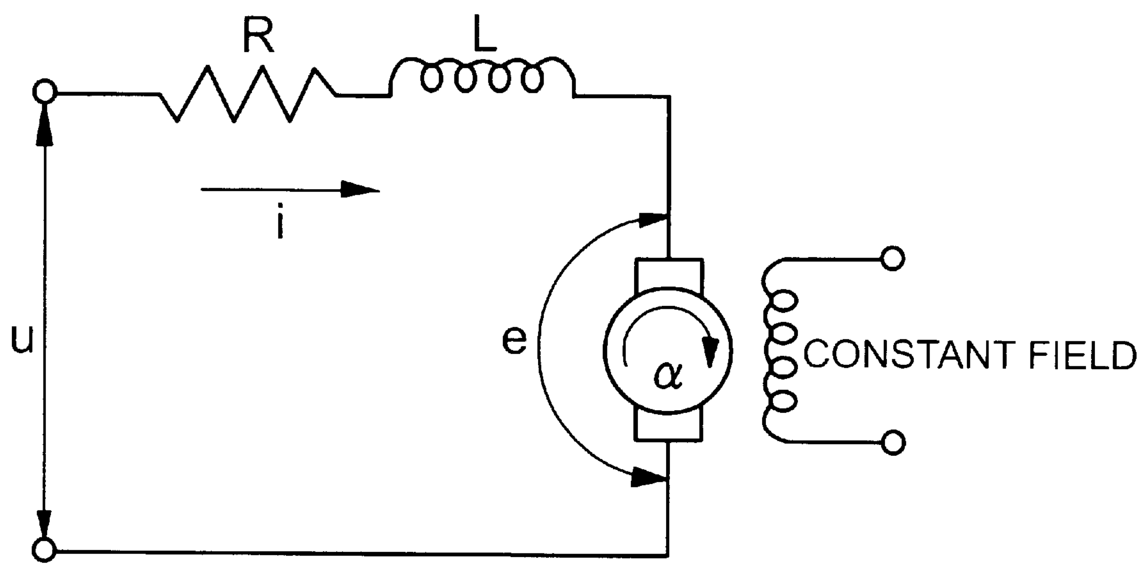
FIG. 3 is an illustration of a model for an electric motor.

In the electric motor 7 shown in FIG. 3, the terminal voltage is represented by u; the supplied current is j; the resistance is R; the inductance is L; the counter electromotive force is e; and the rotational angle is $\alpha$. The terminal voltage u is represented by the following equations:

$$u = L\frac{di}{dt} + Ri + e \tag{1}$$

$$e = K\frac{d\alpha}{dt} \tag{2}$$

where K is a constant depending on the characteristics of the electric motor 7.

From the above equations, the rotational angle $\alpha$ is calculated according to:

$$\begin{aligned} \alpha &= \int \frac{d\alpha}{dt} dt \\ &= \frac{1}{K}\int \left(u - L\frac{di}{dt} - Ri\right) dt \end{aligned} \tag{3}$$

In the equation (3), the inductance L can be omitted, because it is generally small. As a result, equation (3) can be represented by the following equation:

$$\alpha = \frac{1}{K}\int (u - Ri) dt \tag{4}$$

As is apparent from the equation (4), if the constants R and K are determined, the rotational angle $\alpha$ of the electric motor 7 can be calculated based on the terminal voltage u and the supplied current i. The rotational angle $\alpha$ of the electric motor 7 and the steering angle θ of the front wheels Wf, Wf are in a given relationship to each other and hence, the steering angle θ of the front wheels Wf, Wf can be calculated based on the rotational angle $\alpha$ of the electric motor 7, thereby eliminating the conventionally required steering angle detecting means, to thereby reduce the number of parts and the cost. Moreover, the voltage detecting means Su and the current detecting means Si are mounted in a standard electric power-steering device and hence, a special cost for mounting them is not required.

The locus of movement of the vehicle to the target position has been previously stored in the storage means 23 in the above embodiment, but the locus of movement from the current position of the vehicle V to the target position can be calculated.

As discussed above, the rotational angle of the electric motor is calculated based on the terminal voltage and the supplied current in the electric motor. Therefore, by the fact that the steering angle of the wheel is calculated based on the rotational angle of the electric motor, the conventionally required steering angle detecting means can be eliminated to reduce the number of parts and the cost.

Further, the locus of movement is set in terms of the steering angle of the wheel relative to the traveling distance of the vehicle. Therefore, a consistent locus of movement can be ensured irrespective of variations in vehicle speed during the automatic parking control.

Although the embodiment of the present invention has been described in detail, it will be understood that various modification may be made without departing from the subject matter of the present invention.

I claim:

1. An automatic steering system for a vehicle having wheels, comprising:

a movement locus setting means for storing a locus of movement of a vehicle to a target position, an electric motor for steering steerable wheels of the vehicle wheels, a control means for controlling a rotational angle of said electric motor to generate a steering angle for the wheels whereby the vehicle passes through said locus of movement, wherein said control means calculates said rotational angle as a function of terminal voltage and supplied current to said electric motor.

2. An automatic steering system for a vehicle having wheels, comprising:

a movement locus setting means for calculating a locus of movement of a vehicle to a target position, an electric motor for steering steerable wheels of the vehicle wheels, a control means for controlling a rotational angle of said electric motor to generate a steering angle for the wheels whereby the vehicle passes through said locus of movement, wherein said control means calculates said rotational angle as a function of terminal voltage and supplied current to said electric motor.

3. An automatic steering system for a vehicle according to claim 1 or 2, wherein said locus of movement is set as a function of the steering angle of the wheels relative to the traveling distance of the vehicle.

4. An automatic steering system for a vehicle according to claim 1 or 2, wherein said control means calculates said rotational angle of said electric motor according to the equation:

$$\alpha = \frac{1}{K}\int (u - Ri)dt$$

wherein $\alpha$ is the rotational angle, K is a first predetermined constant u is the terminal voltage, R is a second predetermined constant and i is the supplied current.

* * * * *